Figure 8:
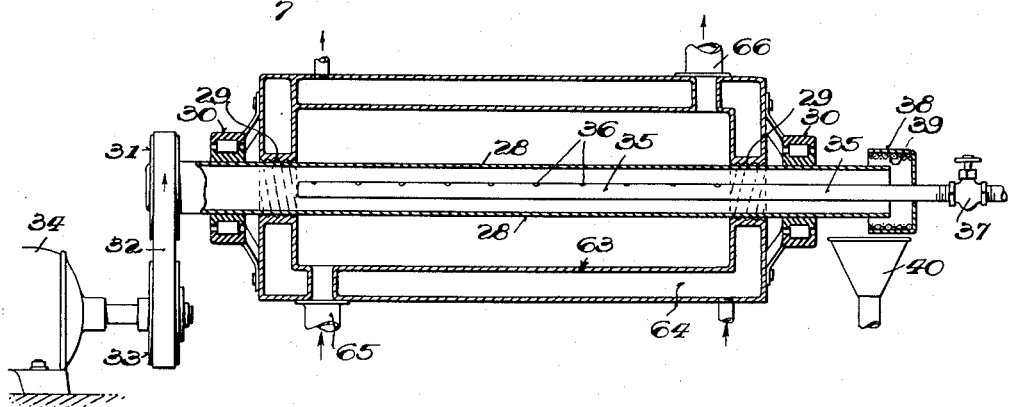

June 4, 1935.  W. A. MOIR  2,004,009
METHOD OF AND APPARATUS FOR CONDITIONING CHOCOLATE OR THE LIKE
Filed June 4, 1934  2 Sheets-Sheet 1
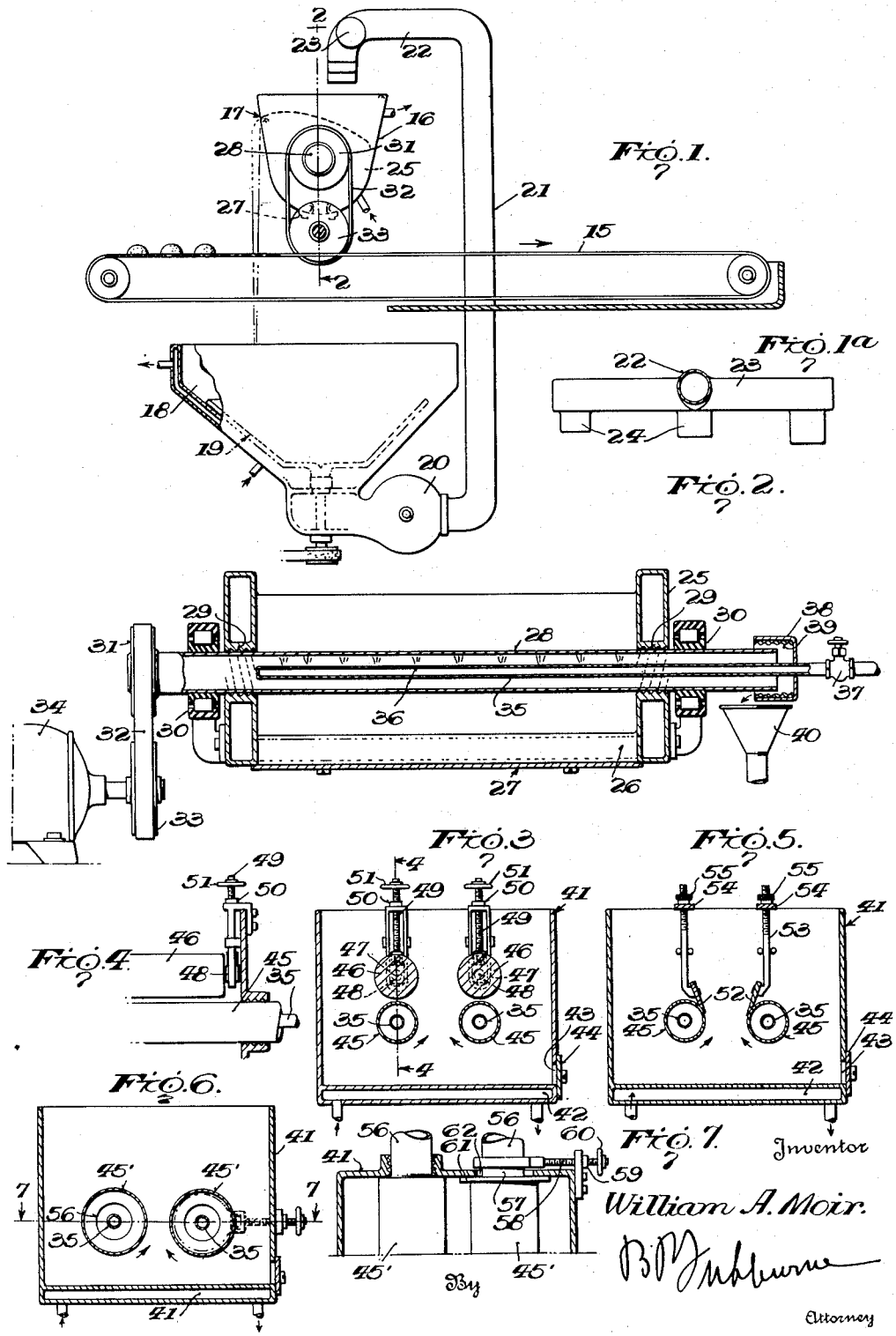
Inventor
William A. Moir.
By B. M. Jusburne
Attorney Inventor
William A. Moir.

Patented June 4, 1935

2,004,009

UNITED STATES PATENT OFFICE 2,004,009

METHOD OF AND APPARATUS FOR CONDITIONING CHOCOLATE OR THE LIKE

William A. Moir, New York, N. Y.

Application June 4, 1934, Serial No. 728,991

16 Claims. (Cl. 99—11)

My invention relates to a method of and apparatus for conditioning chocolate or other similar substances, for coating or other purposes.

An important object of the invention is to provide a method of the above mentioned character which will produce a fine grain throughout substantially the entire mass of the chocolate.

A further object of the invention is to provide a method of the above mentioned character which will also grind or smooth down the edges or surfaces of the solid particles within the chocolate, such as sugar, cocoa, etc., producing a mass having exceedingly smooth texture.

A further object of the invention is to provide apparatus for practicing the method.

A further object of the invention is to provide apparatus of the above mentioned character which may be used in connection with a coating machine, to supply the chocolate to the candy centers.

A further object of the invention is to provide apparatus of the above mentioned character which may be used to treat the chocolate, such chocolate being then employed for any desired purpose, such as hand dipping or moulding.

In accordance with my invention the heated chocolate mass is subjected to the action of a rotary tubular or hollow cooling element driven at a high speed. It is essential that this cooling element be driven at a high speed, as distinguished from the present method of slow agitation, during cooling. By high speed is meant a rotation of the tubular cooling element of from about 1,000 R. P. M. to 4,000 R. P. M. I have found that where a cooling tube has a diameter of 2 inches that satisfactory results are obtained by rotating the same at about 2,000 R. P. M. When the diameter of the tubular cooling element is decreased, its speed of rotation is increased. If a cooling tubular element of 1 inch in diameter is employed, satisfactory results would be obtained by rotating the same at about 4,000 R. P. M. or even above this speed. Where the diameter of the tubular cooling element is increased, its speed of rotation is decreased. If the diameter of the tubular cooling element were 6 inches in diameter, satisfactory results could be obtained by rotating the same at about 1,000 R. P. M. The precise high speed to be employed, depending somewhat upon the diameter of the cooling element, must necessarily be determined to some extent by actual tests, under each condition. The tubular cooling element must be rotated at such a high speed that the chocolate will not adhere to the same, but is immediately thrown from the same by the action of centrifugal force. The rapidly rotating cooling element sets the entire mass of chocolate in rotation about it, the rotation of the mass decreasing outwardly from the rotating element. The rapidly rotating mass adjacent to the tubular element travels at approximately the speed of the tubular element and is therefore thrown outwardly by the action of centrifugal force and the mass is also thoroughly mixed by slippage within itself. The chocolate mass thus not only bodily rotates but travels outwardly and inwardly with respect to the tubular cooling element. The chocolate mass adjacent to the tubular element is subjected to the maximum cooling action and it is this cooled portion of the chocolate mass which is thrown out by centrifugal force while the warmer or more fluid portion approaches the tubular element to contact therewith. By this rapid rotation in the presence of the cooling action, I have found that the chocolate mass, when set, as when coated upon candy centers, will possess a fine fat grain uniformly distributed throughout substantially the entire mass. It is believed that the fine fat grain is produced, instead of a large fat grain, because any particular portion of the mass only momentarily remains in contact with the rapidly rotating tubular cooling element and further, on account of the complete mixing of the mass. The rotation of the chocolate mass at decreasing speeds from the rotatable tubular element also produces a grinding action between and upon the solid particles, or the like. This grinding action serves to polish or smooth down the edges of the solid particles and also further reducing their size to some extent, with result that the chocolate mass, when set or cooled, will possess a smooth texture.

Figure 9:
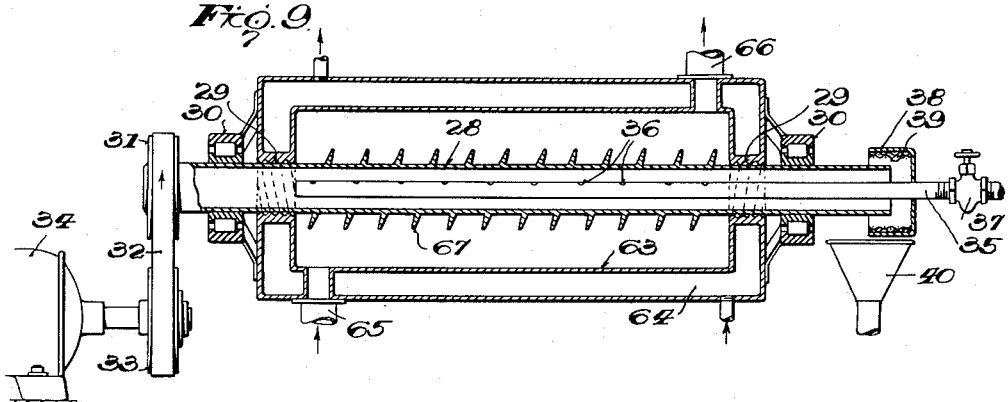
Figure 10:
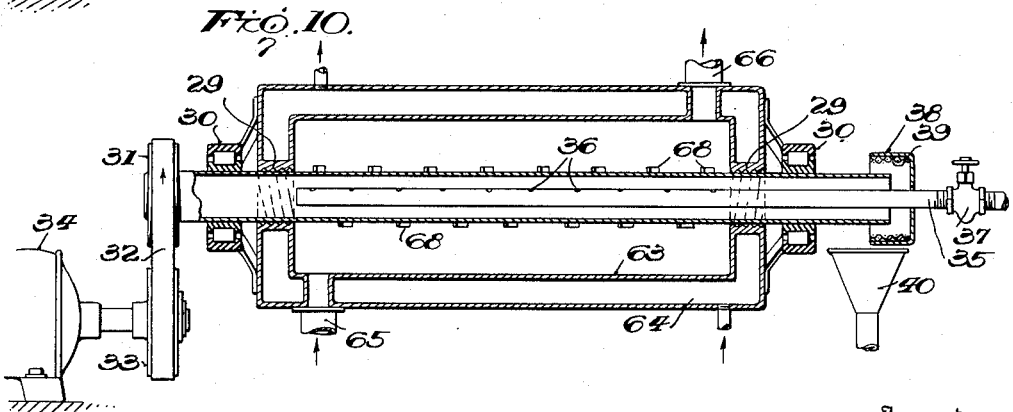

In the accompanying drawings forming a part of this application and in which like numerals are employed to designate like parts throughout the same, Figure 1 is a side elevation of apparatus embodying my invention, Figure 1a is a side elevation of an outlet pipe, Figure 2 is a vertical longitudinal section through the chocolate conditioning unit embodying the invention, Figure 3 is a transverse section through a modified form of a chocolate conditioning unit, Figure 4 is a detailed section taken on line 4—4 of Figure 3, Figure 5 is a transverse section through a chocolate conditioning unit embodying a further form of the invention, Figure 6 is a similar view through a unit embodying a still further form of the invention, Figure 7 is a horizontal section taken on line 7—7 of Figure 6, Figure 8 is a central vertical longitudinal section through a further modified form of a chocolate conditioning apparatus, Figure 9 is a similar view through a further modified form of the invention, and, Figure 10 is a similar view through a still further modified form of the invention.

In the drawings wherein for the purpose of illustration is shown a preferred embodiment of my invention, (Figures 1 and 2) the numeral 15 designates a horizontally arranged travelling screen belt of a chocolate coating machine of any well known or preferred type. This belt is travelling in the direction of the arrow. Arranged near and above this belt is a hopper or receptacle 16 included in a chocolate conditioning apparatus or unit. This hopper has the upper edge of one side cut away at 17, so that the fluid chocolate will overflow and pass upon the travelling screen 15 to coat the candy centers thereon, while the excess chocolate will pass through the travelling screen and be collected in the lower hopper 18. Within this lower hopper the collected chocolate may be reheated slightly, to melt only a portion of the fat content thereof, while the same is being stirred by a rotary agitator 19. The purpose of remelting only a portion of the fat content is to convert this portion of the fat content into a liquid state so that the coated chocolate will have a high gloss, but the major portion of the fat content of the chocolate is not remelted, as this would degrain the chocolate treated in the hopper 16, for providing the fine grain, as will be explained. The hopper 18 may be heated by any suitable means and may be equipped with a water jacket if desired. Connected with the bottom or outlet of the hopper 18 is a pump 20, discharging the fluid chocolate into a pipe 21, which extends upwardly and has a horizontal extension 22. This horizontal extension carries a horizontal extension 23, Figure 1a, arranged above and extending longitudinally of the hopper 16 and this extension 23 has depending spaced outlets 24, for discharging the chocolate into the hopper at spaced longitudinal points.

As more clearly shown in Figure 1, the hopper 16 preferably has its lower portion or bottom circularly curved and this hopper is provided with a water jacket 25 so that the hopper may be heated. In its bottom, this hopper has a longitudinal slot or outlet 26, through which the chocolate may also pass into the lower hopper 18, and this slot may be partly or wholly covered by an adjustable slide or plate 27.

Extending longitudinally through the hopper 16 is a rotary high speed cooling element 28, which is preferably in the form of a cylindrical tube. This cooling element extends through openings 29 formed in the ends of the hopper 16 and this cooling element has its end portions mounted in bearings 30, arranged exteriorly of the hopper 16, adjacent to the ends of the hopper. The openings 29 are provided with right or left screw-threads and these screw-threads are slightly spaced from the rotating tubular element 28 so that they do not contact therewith. The purpose of these threads is to cause any chocolate which tends to pass outwardly through the openings 29, to be fed back into the hopper, as such escaping chocolate will be rotated by the tubular cooling element and its engagement with the threads will automatically feed the same back into the hopper, thus preventing the escape of the chocolate.

The left end of the tubular cooling element 28 is closed and this closed end is equipped with a pulley 31, driven by a belt 32, engaging a pulley 33, driven by a high speed motor 34.

The opposite end of the tubular cooling element 28 is open so that a water supply pipe 35 may be passed longitudinally within the tubular cooling element 28 to extend through the major portion of the length of the tubular cooling element 28 and for the entire length of the interior of the hopper, as shown. The water supply pipe 35 is provided with apertures 36, spaced longitudinally of the pipe 35, as shown. The pipe 35 is held stationary by any suitable means and is maintained concentric with the tubular cooling element 28 and is spaced from the same, as the diameter of the pipe 35 is much smaller than that of the tubular cooling element 28. The water supply pipe 35 may be equipped with a valve 37 to control the supply of water to the pipe 35, which water is supplied at a suitable pressure and temperature. A cup-shaped guard or cap 38 is fixed upon the outer end of the pipe 35, adjacent to the valve 37, and surrounds the open end of the tubular cooling element 28, in spaced concentric relation. A cylindrical wire screen 39 is arranged within this guard or cap 38. The water passing from the rotating tubular cooling element 28 will be thrown outwardly by centrifugal force against this wire screen lining 39 and its rotation will be accordingly arrested so that the water will gravitate to the bottom of the cover or cap 38 and be discharged into a receptacle 40. In this form of the invention, only one tubular cooling element 28 has been shown.

In Figure 3, I have shown a hopper 41, which may be used instead of the hopper 16. This hopper has a water jacket 42 at its bottom and an outlet opening or slot 43 in one side and near its bottom, which is covered and uncovered by an adjustable slide or plate 44. Extending longitudinally through the hopper 41 are a plurality of tubular cooling elements 45, two being shown for the purpose of illustration. Each cooling element 45 corresponds to the cooling element 28 and is mounted and driven in the same manner and it is cooled by the same water supply pipe 35 extending longitudinally therein. The same means is provided to collect the water discharging from the open end of each tubular cooling element 45. Arranged near and above each tubular cooling element 45 is an idler roll or cylinder 46, arranged within the hopper 41 and extending throughout the major portion of the length of the interior of the hopper. Each end of each roll 46 is provided with a trunnion 47 which is rotatable within a vertically adjustable bearing 48, operating within a stationary vertical guard 49. Each bearing 48 is vertically adjusted by means of a vertical rod 49, having a swiveled connection therewith, and the upper portion of this rod is screw-threaded for engagement within a stationary bearing 50. The rod is turned by means of a wheel or handle 51. It is thus seen that by turning the screw-threaded rod 49, the roll or cylinder 46, which is preferably formed of metal, may be moved toward or from the corresponding tubular cooling element 45. While I prefer for some uses to use the plurality of tubular cooling elements in connection with the rolls or cylinders 46, yet I contemplate employing a plurality of these tubular cooling elements without the companion rolls or cylinders.

In Figure 5, I have shown a construction identical with that shown in Figure 3, excepting that the rolls or cylinders 46 and supporting means therefor are omitted. The blades or scrapers 52 are arranged adjacent to and are in slidable contact with the rotary tubular cooling elements 45 and extend throughout substantially the entire length of these tubular cooling elements within the hopper 41. These blades are vertically adjustable, and for this purpose they are supported by vertical rods 53, extending through apertured stationary lugs 54. The upper ends of these rods are threaded for engagement with nuts 55. By turning these nuts the rods 53 may be raised or lowered, as is obvious.

In the Figures 6 and 7, I have shown a further modification of the invention. In these figures the same hopper 41 is employed. I also use a plurality of tubular cooling elements 45', corresponding to the tubular elements 45. Each tubular element is provided at each end with a reduced extension 56, which is mounted in a bearing like the bearing 30. One tubular cooling element 45' is adjustable and is movable toward and from the companion tubular cooling element, and the bearings receiving the reduced extensions of this tubular element are transversely movable with respect to the companion tubular cooling element. A ring or collar 57 rotatably receives the reduced extension 56 at each end of the shiftable tubular cooling element and this ring has a swiveled connection with an adjusting rod 58, the outer end portion of which is screw-threaded for engagement within a screw-threaded stationary boss 59. The rod is turned by a hand-wheel 60 or the like. By turning the hand-wheel 60 it is thus seen that the shiftable tubular cooling element 45' may be moved toward or from the companion tubular element. A flange 61 is rigidly attached to each end of the shiftable tubular cooling element 45' and permanently covers an elongated opening or slot 62.

In Figure 8, I have shown a further modification of the invention embodying a cylindrical closed hopper 63, corresponding to the hopper 16, and the hopper 63 is equipped with a water jacket 64. The chocolate is supplied into the bottom of this hopper through a pipe 65 and discharges from the top of the same, at its opposite end, through a pipe 66. The same tubular cooling element 28 is provided, which is mounted and driven in the same manner as described in connection with the first form of the invention, and the same water supply pipe 35 and associated elements are provided to supply cooling water within the tubular element.

In Figure 9, I have shown a further modification of the invention which is identical with that shown in Figure 8, except that the rotary tubular cooling element 28 is provided with a continuous spiral rib or flange 67, which is so pitched that it serves to feed the chocolate longitudinally within the hopper 63 toward the outlet pipe 66. The spiral flange 67 has a relative short radial dimension. The spiral rib 67 serves as a cooling element or fin while at the same time agitating the mass and feeding the same longitudinally within the hopper toward the outlet pipe 66.

In Figure 10, I have shown a further modification of the invention which is identical with that shown in Figure 8, except that the rotary tubular cooling element 18 is provided with relatively short radial agitators or paddles 68, which serve as cooling fins and also as propelling means for the chocolate mass.

In the practice of the method in connection with the first arrangement of the apparatus, as shown in Figures 1 and 2, the heated fluid chocolate is withdrawn from the lower hopper 18 and fed through the pipe 21 into the upper hopper 16, and overflows from the upper hopper upon the screen belt 15 to coat the candy centers thereon, while the excess chocolate passes through this screen belt and is collected in the lower hopper 18 so that the cycle of operation may be repeated. Before the chocolate is fed to the screen belt 15 to coat the candy centers it is treated or conditioned within the hopper 16 so that it will have a uniform fine grain throughout substantially its entire mass. The tubular cooling element 28 is submerged in the chocolate mass and is driven at a high speed such as 2,000 R. P. M. Cooling water is supplied through the pipe 35 into the tubular element 28 so that the temperature of the tubular cooling element is kept substantially constant at about 45° F. to 70° F. while satisfactory results can be obtained by maintaining this temperature at about 60° F. The rapidly rotating cooling element 28 rotates the entire chocolate mass about the same, and the rotation of this chocolate mass decreases outwardly from the cooling element. That portion of the chocolate mass which contacts with the rapidly rotating cooling element 28 is cooled so that a portion of the fat content becomes solid and produces fine particles of such solid fat content, which produce a fine grain in the chocolate mass. This cooled portion of the chocolate mass will not adhere to the rapidly rotating cooling element but is thrown therefrom by centrifugal force and becomes intimately mixed with the outer portion of the chocolate mass. By increasing the speed of rotation of the tubular element it will heat the chocolate mass, due to frictional engagement therewith, and if such speed is increased the tubular cooling element would have to be further cooled to overcome this heating tendency so that it will still properly function as a cooling element. If the cooling element is reduced in temperature without increasing its speed of rotation, there would be a tendency for a film of the chocolate to congeal and collect upon the tubular cooling element, but this film would then serve as a heat insulating means whereby the rotating tubular cooling element could not as readily cool the chocolate mass and would heat the same to some extent which would prevent any additional chilling of the chocolate mass so that additional chocolate would not accumulate on the rotating cooling element. It is preferred to drive the cooling element at the proper speed, and maintain the same at the proper temperature, so that it will properly cool the chocolate mass without the accumulation of any perceptible or substantial amount of chocolate thereon. The character of the chocolate mass is somewhat variable due to the different character of the fat content having fractions at different melting points and experimentation may be necessary in connection with some chocolate masses for determining the precise speed of rotation of the cooling element and the precise cooling temperature of the same. The fine fat grain thus produced is thoroughly mixed throughout substantially the entire chocolate mass, which will produce a fine grain throughout the same. This fine grain is afforded by the fine solid fat particles, as stated, but the rapidly rotating cooling element also serves an additional function, which is the polishing or grinding of the fine sugar particles, solid cocoa particles, etc., due to the frictional engagement between these particles in the rotating mass of chocolate. This will produce a chocolate coating, which when cooled, will be very smooth. After the chocolate mass is thus treated in the hopper 16, the excess chocolate mass is returned to the hopper 18 wherein it is heated sufficiently so that a portion, but not all, of the fat content is remelted to render the chocolate sufficiently fluid. This remelting will free some of the fat as a fluid, which will produce a high gloss in the chocolate coating. The chocolate mass is not heated sufficiently in the hopper 18 to melt all of the fat content as this would degrain the entire mass, which is not desired as it is advantageous to retain as much of the grain as possible, yet impart to the chocolate mass a desired fluidity for handling purposes. However, the chocolate mass is partly degrained in the hopper 18, and hence, in order that it may possess a sufficiently high fine grain, it must again be conditioned in the upper hopper 16, as explained. However, the chocolate mass may be heated or melted so that it will be completely degrained, and the proper fine grain may be restored to the same by treating in the hopper 16. This would require more work and increase the cost.

While I have shown the treatment of the chocolate mass in the hopper 16 as associated with the travelling screen of the coating machine, the invention is in no sense restricted to this operation. The chocolate mass may be treated independently of a coating machine and the resultant product may be moulded or used in other conventional ways. The form of apparatus shown in Figure 8, is particularly suitable for this purpose. The chocolate mass is supplied into the hopper 63 through the pipe 65 and will be withdrawn through the pipe 66. The same cooling of the chocolate mass, under the same conditions as described in connection with the first form of the invention, will take place. However, the chocolate mass may be retained in this hopper 63 for a greater length of time and when this is done, the rotating cooling element will effect a greater polish or grinding action upon the solid particles.

The same mode of operation which occurs in the apparatus shown in Figure 8, will occur in the apparatus shown in Figure 9, except that in addition to the rotary movement of the chocolate mass, the spiral rib or bin 67 will serve as cooling means, as additional agitating means and as means to feed the chocolate mass longitudinally toward the outlet opening.

Substantially the same mode of operation occurs in connection with the apparatus shown in Figure 10, except that the paddles 68 serve as cooling fins and agitating means but do not affect the longitudinal travel of the chocolate mass.

While I have shown and described only one rotatable cooling element in connection with the forms of apparatus shown in Figures 1, 2, and 8 to 10 inclusive, the invention is not restricted to the use of only one tubular cooling element. Satisfactory results are obtained by employing two or more of these tubular cooling elements, as shown in Figures 3 to 5 inclusive. Where it is desired to increase the grinding action upon the solid particles, I arrange freely rotatable idler rolls or cylinders near the rotatable cooling element or elements, as shown in Figure 3. These idler rolls rotate with the mass and increase the grinding action. Where the temperature of the rotatable tubular cooling element or elements is considerably reduced, it may be advantageous to scrape the accumulated chocolate mass therefrom, and scraper elements may be associated with the tubular cooling elements, as shown in Figure 5.

The water jacket 26 of the first form of the apparatus is provided so that the temperature of the chocolate mass in the hopper 16 may be regulated. When the apparatus is shut down, hot water is circulated through the water jacket 26, so that the chocolate mass is retained suitably hot and prevented from solidifying. Instead of reheating the chocolate mass in the hopper 18, Figure 1, this reheating could occur in the hopper 16 by the use of the water jacket 26. However, when the reheating occurs in the hopper 18, reheating does not ordinarily occur in the hopper 16. Where the hopper 16 is not used in connection with a coating machine, but simply as a part of a chocolate conditioning machine, the reheating may occur in this hopper 16, by the use of the water jacket, and this is also true with the remaining hoppers or receptacles having the rotatable cooling elements therein, as shown in all of the remaining modified forms of the invention. In each form of the invention, the water jacket may simply be employed to heat the chocolate mass when the machine is shut down, or it may be employed to reheat the chocolate mass during the operation of the apparatus.

While the apparatus is primarily designed to condition the chocolate mass by the cooling action of the rotatable element, it is obvious that this rotatable element could also be employed to heat and agitate the chocolate mass, if desired.

It is to be understood that the forms of my invention herewith shown and described are to be taken as preferred examples of the same and that various changes may be made in the shape, size, and arrangement of parts of the apparatus, and various changes may be also made in the speed of rotation of the tubular cooling element and the temperature of the same and the temperature of the chocolate mass, without departing from the spirit of my invention or the scope of the subjoined claims.

Having thus described my invention what I claim is:

1. The method of treating a chocolate mass for providing a fine fat grain throughout substantially the entire mass, comprising rapidly rotating the mass and causing parts of the same to momentarily contact with a cooling medium.

2. The method of treating a chocolate mass for providing a fine fat grain throughout substantially the entire mass, comprising rapidly rotating the mass and causing parts of the same to momentarily contact with a cooling medium and to be thoroughly mixed.

3. The method of treating a chocolate mass for providing a fine fat grain throughout substantially the entire mass, comprising subjecting the mass to contact with a rapidly rotating cooling element whereby parts of the mass which contact with the cooling element are thrown therefrom by centrifugal force and the mass thoroughly mixed.

4. The method of treating a chocolate mass for providing a fine fat grain throughout substantially the entire mass, comprising subjecting the heated mass to the action of a rapidly rotating cooling element submerged therein.

5. The method of treating a chocolate mass for providing a fine fat grain throughout substantially the entire mass, comprising rotating the mass by contact with a rapidly rotating cooling element submerged therein, the speed of rotation of the mass decreasing from the cooling element, and maintaining the temperature of the cooling element substantially constant.

6. The method of treating a chocolate mass for providing a fine fat grain therein, comprising holding the mass in a heated condition in a confined space, subjecting the mass to contact with a rapidly rotating tubular cooling element submerged therein so that the mass is bodily rotated with the cooling element and its speed of rotation decreases from such element, and maintaining the temperature of the cooling element substantially constant during such treatment.

7. The method of treating a chocolate mass for providing a fine fat grain therein, comprising holding the mass in a confined space while subjecting the same to the action of a cooling element submerged therein and rotated at a high speed of substantially 1,000 R. P. M. to 4,000 R. P. M. and maintaining the temperature of the cooling element substantially constant during such treatment.

8. The method of treating a chocolate mass, comprising collecting the chocolate mass and heating the same only sufficiently for melting a portion of the fat content of the same, subjecting the mass thus heated to the action of a cooling element submerged therein and rotated at a high speed of substantially 1,000 R. P. M. to 4,000 R. P. M., and maintaining the temperature of the cooling element substantially constant.

9. The method of treating a chocolate mass, comprising holding the mass in an elongated enclosed space, subjecting the mass thus held to the action of a cylindrical tubular cooling element submerged in the mass and extending throughout the entire length of the mass and driven at a high speed, and applying a cooling medium to the interior of the tubular cooling element to maintain the temperature of the same substantially constant during the treatment of the mass.

10. The method of treating a chocolate mass, comprising holding the mass in a confined space while at a sufficiently high temperature to render the same fluid, and subjecting the fluid mass to the action of a cooling element submerged therein and rotated at a high speed of substantially 1,000 R. P. M. to 4,000 R. P. M. while maintaining the temperature of the cooling element from 45° F. to 70° F.

11. The method of treating a fluid chocolate mass for polishing or grinding the solid particles therein, comprising confining the mass in an inclosed space, subjecting the mass to the action of a rotatable tubular element submerged therein and driven at a high speed of about 1,000 R. P. M. to 4,000 R. P. M. to thereby cause the mass to rotate about the element, such rotation decreasing from the element and the solid particles having grinding action with each other, and regulating the temperature of the mass by supplying a temperature regulating medium to the interior of the tubular element.

12. The method of treating a chocolate mass for providing a fine fat grain therein, comprising subjecting a heated fluid chocolate mass to the contacting action of an element having a cooling temperature substantially below that of the chocolate mass to cause a portion of the fat content contacting with the cooling element to solidify and produce a fine fat grain, rotating the cooling element at such a high speed that substantially all of the solidified fat content portion is thrown from the cooling element by centrifugal force and mixed with the remainder of the mass, and then withdrawing the treated chocolate mass from the presence of the cooling element.

13. The method of treating a chocolate mass for providing a fine fat grain therein, comprising subjecting a heated fluid chocolate mass to the contacting action of an element having a cooling temperature substantially below that of the chocolate mass to cause a portion of the fat content contacting with the cooling element to solidify and produce a fine fat grain, rotating the cooling element at such a high speed that the chocolate mass is rotated and substantially all of the solidified fat content portion is thrown from the cooling element by centrifugal force and mixed with the remainder of the mass, maintaining the temperature of the chocolate mass during such treatment sufficiently high so that it remains fluid, and then withdrawing the treated chocolate mass from the presence of the cooling element.

14. In the method of treating a heated fluid chocolate mass for providing a fine fat grain therein, the steps of applying a rapid rotary force to the inner portion of such mass to thereby rotate the mass so that its speed of rotation decreases radially outwardly while subjecting the inner rapidly rotating portion of the mass to a cooling action for solidifying a portion of the fat content and producing fine fat grains, throwing the solidified fat content portion outwardly due to the action of centrifugal force, and mixing the solidified fat content portion with the remainder of the chocolate mass.

15. In the method of treating a heated fluid chocolate mass for providing a fine fat grain therein, the steps of applying a rapid rotary force to the face of such mass to rapidly rotate the same while subjecting such face to a cooling action for solidifying a portion of the fat content thereof and producing fine fat grains, throwing the solidified fat content portion outwardly due to the action of centrifugal force, and mixing the solidified fat content portion with the remainder of the chocolate mass.

16. In the method of treating a heated fluid chocolate mass for providing a fine fat grain therein, the steps of applying a rapid rotary force to the chocolate mass while subjecting the chocolate mass to a cooling action adjacent to the point of application of the rotary force.

WILLIAM A. MOIR.